Jan. 12, 1926.  1,569,713
W. C. CARR
CONTROLLER
Filed Sept. 10, 1921   2 Sheets-Sheet 1
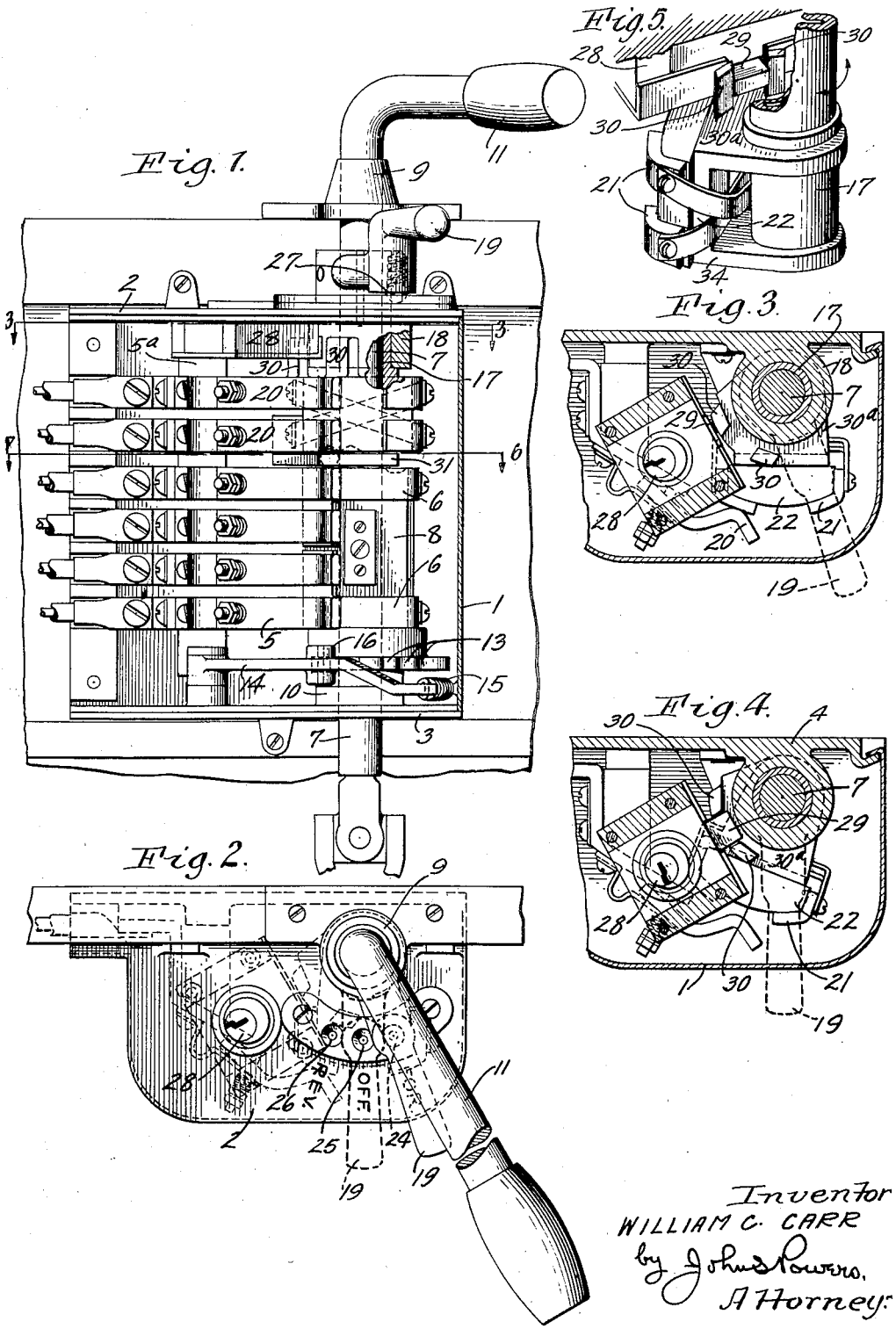
Inventor
WILLIAM C. CARR
by John Powers,
Attorney.

Jan. 12, 1926.
W. C. CARR
1,569,713
CONTROLLER
Filed Sept. 10, 1921     2 Sheets—Sheet 2
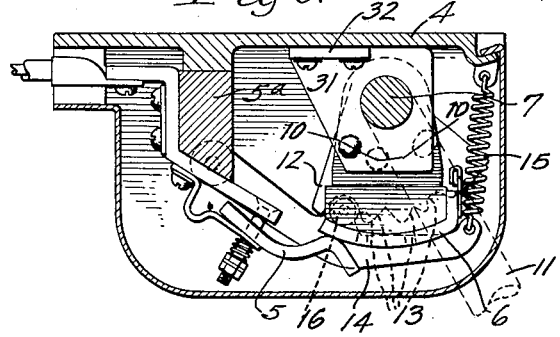
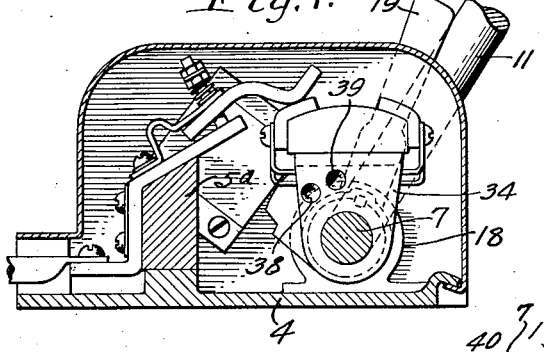
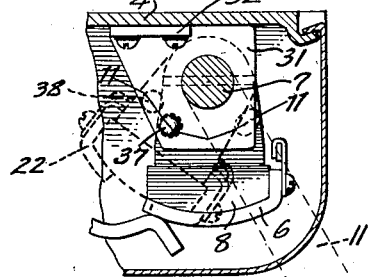
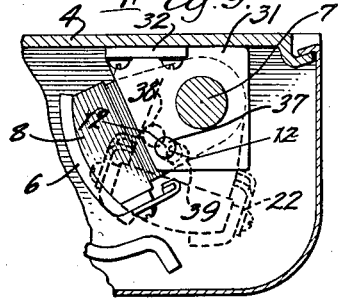
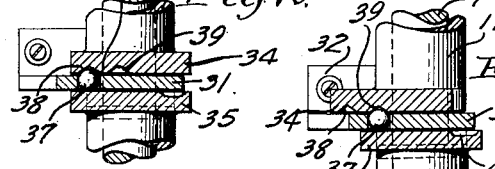
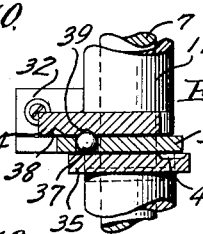
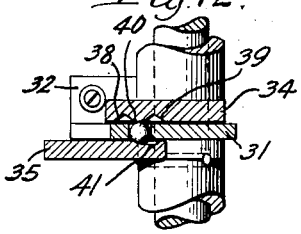
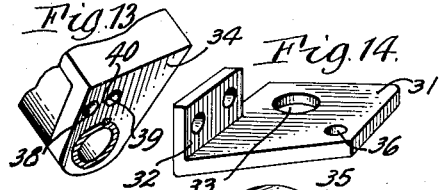
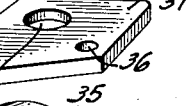
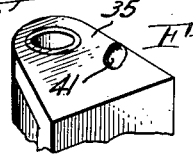
Inventor
WILLIAM C. CARR
by John S. Powers.
Attorney Patented Jan. 12, 1926.

1,569,713

UNITED STATES PATENT OFFICE.

WILLIAM C. CARR, OF BUFFALO, NEW YORK, ASSIGNOR TO THE AUTOMATIC TRANS-PORATION COMPANY, OF BUFFALO, NEW YORK, A CORPORATION OF ARIZONA.

CONTROLLER.

Application filed September 10, 1921. Serial No. 499,770.

*To all whom it may concern:*

Be it known that I, WILLIAM C. CARR, a citizen of the United States, residing at Buffalo, in the county of Erie and State of New York, have invented certain new and useful Improvements in Controllers, of which the following is a specification.

This invention relates to improvements in controllers for electric motors especially adapted for use on electric vehicles.

Generally stated, the improvements consist in a novel and advantageous relationship between the controller shaft and the reversing switch, insuring a simple, compact and unitary structure; the provision of means for locking the reversing switch in its neutral position; and the provision of means in cooperation with the reversing switch and controller shaft for controlling one of said parts from the other and, more specifically, for holding the reversing switch against movement except when the controller handle is in "off" position and for holding the controller handle in "off" position when the reversing switch is in neutral or "off" position, thereby compelling the controller handle to be brought to and maintained in "off" position as a condition necessary for the manipulation of said switch with resultant advantage in point of safety.

The invention consists in novel features of structure and combination appurtenant to the above stated features of improvement and which will be set forth in detail as the description proceeds.

An embodiment of the invention is illustrated in the accompanying drawings wherein:

Figure 1 is an elevation, partly in section, of a controller in which the features of the invention are incorporated.

Figure 2 is a plan view thereof.

Figure 3 is a horizontal section on the line 3—3 of Figure 1, the reversing switch being in "forward" position.

Figure 4 is a similar view, the reversing switch being in neutral position.

Figure 5 is a detail perspective view showing parts of the reversing switch and the cooperating lock mechanism, the switch being in neutral or "off" position.

Figure 6 is a horizontal sectional view looking downward on the line 6—7 of Figure 1, the reversing switch being in forward position.

Figure 7 is a horizontal sectional view looking upward on the line 6—7 of Figure 1.

Figures 8 and 9 are detail horizontal sectional views in the same plane as Figure 6 and showing the reversing switch in "reverse" and neutral positions respectively.

Figure 10 is a detail cross section on the line 10—10 of Figure 6.

Figure 11 is a detail cross section on the line 11—11 of Figure 8.

Figure 12 is a detail cross section on the line 12—12 of Figure 9.

Figures 13, 14 and 15 are detail perspective views showing cooperating elements which participate in the functions of holding the reversing switch against movement except when the controller handle is in "off" position and of holding the controller handle in "off" position when the reversing switch is in neutral position.

The operating parts are enclosed in a casing 1 having top and bottom plates 2 and 3, and are carried by a supporting plate 4 which forms the back wall of the casing. As regards the operating speeds the controller is of usual construction, the mechanism comprising the cooperating stationary and movable contacts 5 and 6, a controller shaft 7 and a block 8 mounted on the shaft 7 and carrying the contacts 6. The shaft 7 is journaled in upper and lower bearings 9 and 10 and carries at its upper end an operating handle 11. The shaft is held in its "off" position or in any operative position within the range of permissible speeds by a friction latch of any suitable construction and which may comprise a segment 12 fitted on the shaft near the bottom of the casing and provided with marginal notches 13 and a pivoted detent arm 14 held by a spring 15 and provided with a projection 16 for engagement in any one of the notches 13.

According to the invention the reversing switch is mounted co-axially of the shaft 7 and includes a shaft 17, one of the shafts being tubular and the other shaft projecting through the tubular shaft. In the construction shown and preferred the shaft 17 is tubular and is journalled in a bearing 18 formed with the plate 4. The shaft 17 is operated by a handle 19 fitted to its projecting upper end. The reversing switch includes stationary and movable contacts 20 and 21 and a block 22 fitted on the shaft 17 and carrying the contacts 21.

Such arrangement of the controller shaft 7 and the reversing switch secures a substantial advantage in point of compactness since the contacts 5 and 20 may be mounted in line with one another and on the same supporting bar 5ᵃ and the blocks 8 and 22 may be similarly mounted in alinement and no bearing or supporting parts are required other than those provided for the shaft 7. The arrangement has a further advantage in that the construction may be made unitary, that is to say the controller and reversing switch shafts and their associated contacts may be carried by a common single supporting element.

The top plate 2 is provided with an index plate with which the handle 19 cooperates. The index plate has recesses 24, 25 and 26 corresponding respectively to the "forward," neutral or "off," and reverse positions of the switch and so designated, and the handle 19 is provided with a suitable latch element 27, preferably a spring pressed friction element, for engagement in said recesses, thereby to hold the reversing switch in any one of its three positions.

The invention also includes means for locking the reversing switch in its neutral position. The lock mechanism 28 includes a bolt 29 for which a keeper is provided by a pair of spaced upright lugs 30 on an arm 30ᵃ secured to the shaft 17, said arm being preferably incorporated with the block 22. When the reversing switch is in neutral position the bolt 29 may be operatively engaged between the lugs 30, thereby to prevent an operation of the switch. The lugs 30 are so arranged relatively to the bolt that when the switch is in either "forward" or "reverse" position one lug or the other will be located in front of the bolt and will present an obstruction which prevents the bolt from being thrown. This relation is illustrated in Figure 3 which shows the reversing switch in its "forward" position. It will be apparent, therefore, that the reversing switch cannot be locked except as it may be in its neutral position. The lock mechanism 28 may be of any suitable construction but it is preferably key operated and as thus constructed may be secured to the under side of the top plate 2 with its barrel exposed through an opening in said plate as shown in Figure 2.

This invention also includes means whereby one of the companion elements constituted by the reversing switch and the controller shaft may control the operation of the other and preferably whereby said companion elements are under mutual control, that is to say, means for holding the reversing switch against movement except when the controller shaft is in "off" position and for holding the controller shaft in "off" position when the reversing switch is in neutral position. In the construction shown and preferred such means includes as companion elements a stationary arm 31, having an attachment flange 32 by which it may be fastened to the supporting plate 4 and preferably having an opening 33 for the shaft 7, and arms 34 and 35 mounted on and movable with the shafts 17 and 7 respectively, the several arms being in parallel planes and the stationary arm being arranged between the movable arms. As shown and preferred the arms 34 and 35 are incorporated with the blocks 22 and 8 respectively. The stationary intermediate arm 31 is provided with an opening 36 in which is arranged a latching element 37, preferably in the form of a ball. This ball is of slightly greater diameter than the depth of the opening 36, i. e., the thickness of the arm 31 and is freely movable in said opening in a direction normal to the arms 34 and 35 whereby it will always project to a slight degree either above or below said arm, according to the positions of the related parts. The upper arm 34 which is associated with the reversing switch is provided in its face which adjoins the arm 31, i. e., its under face, with two recesses 38 and 39 and with a web 40 between the recesses and separating them from one another. The recesses are preferably substantially conical or otherwise formed whereby the web 40 may, in either direction of movement of the arm 34, act as a cam on the ball 37. The recesses 38 and 39 are adapted for latching cooperation with the ball 37 when the reversing switch is in its "forward" or "reverse" positions, respectively, and the controller shaft is in any "on" position. The arm 35 is provided in its face which adjoins the arm 31, i. e., its upper face, with a single recess 41 which is adapted for latching cooperation with the ball 37 when the reversing switch and the controller shaft are both in "off" positions, the recess 41 being formed to exert a cam action on the ball 37 when the controller shaft 7 is moved from its "off" position. Figures 6 and 10 show the relation of the parts when the reversing switch is in "forward" position and the controller shaft is in an "on" position. In this case the ball 37 is engaged in the recess 38 of the arm 34 and is positively held so engaged by the arm 35, such engagement being maintained until the controller shaft is returned to "off" position and being effective to hold the reversing switch immovable and thereby prevent its operation. If now it be desired to change the position of the reversing switch the controller shaft must first be brought back to "off" position whereupon the reversing switch may be moved first to neutral and then to "reverse" position. As the reversing switch is brought into neutral position the ball 37 drops, or by the web 40 is forced, into engagement with the recess 41 of the arm 35 and when the switch is finally in neutral position the web 40 overlies the ball 37 as an obstruction and positively maintains its engagement in the recess 41, thereby to hold the controller shaft immovable and to prevent its operation. This relation of the parts is shown in Figures 9 and 12. It will thus be apparent that when the reversing switch is in neutral position it is impossible to set the controller shaft in any "on" position and the danger of an unexpected operation of the motor in connection with the manipulation of the reversing switch is entirely eliminated. If now the switch be moved to "reverse" position the recess 39 of the arm 34 is alined with the ball 37 and as soon as the controller shaft is moved from its "off" position the ball 37 is forced with a cam action from the recess 41 into engagement with the recess 39, this engagement being positively maintained by the arm 35 throughout the range of "on" positions of the controller shaft. The engagement of the ball 37 in the recess 39 is shown in Figures 8 and 11 and is effective to hold the reversing switch immovable and prevent its operation in precisely the same way that the switch is held immovable and its operation prevented when it is in "forward" position and the ball 37 is held by the arm 35 and in an "on" position of the controller shaft in engagement with the recess 38. When it is desired to move the switch from "reverse" position the same sequence of operations is required as when moving the switch from "forward" position, that is to say the controller shaft 7 must first be brought to "off" position in order to release the switch and the latter may thereupon be moved first to neutral and then to "forward" position, the ball 37 being held engaged in the recess 41 of the arm 35 when the switch is in neutral position whereby a movement of the switch to an "on" position, i. e., "forward" position in the operation now assumed, is necessary to release the controller shaft and permit its movement to an "on" position.

It will thus be apparent that the controller shaft cannot be moved except as the reversing switch is in an "on" position and that the reversing switch cannot be moved from such "on" position except as the controller shaft is in an "off" position. Consequently the switch cannot be set to reverse the motor until after the power has been cut off and the controller shaft cannot be set to start the motor until after the reversing switch has been operated to provide for the operation of the motor in the direction desired. It will also be apparent that when the reversing switch is locked in neutral position the controller shaft is as effectively locked in "off" position.

Having fully described my invention, I claim:

1. In a controller, in combination, a controller shaft, a reversing switch including a tubular operating shaft through which the controller shaft projects, movable contacts carried by the tubular shaft, movable contacts carried by the controller shaft below the tubular shaft, stationary contacts arranged in line with one another for cooperation with the several movable contacts, a common supporting bar for the stationary contacts and a supporting plate having a bearing for the tubular shaft and to which said bar is attached.

2. In a controller, in combination, a controller shaft, a lower block mounted thereon and carrying movable contacts, a tubular reversing switch shaft mounted on the controller shaft above said block, an upper block mounted on the tubular reversing switch shaft and carrying movable contacts, locking mechanism for the reversing switch shaft which comprises a movable bolt and a pair of lugs provided on the top of the upper block between which said bolt may be engaged to lock said upper block and tubular shaft in an intermediate position thereof, and means including elements located intermediate said blocks and adjacent elements incorporated with said blocks and operated by either shaft in a certain position thereof for holding the other shaft against movement from a certain position thereof.

In testimony whereof I affix my signature.

WILLIAM C. CARR.